J. H. KINEALY.
DIAPHRAGM.
APPLICATION FILED MAR. 19, 1915.

1,150,606.

Patented Aug. 17, 1915.

Attest:
Wm. H. Scott
Theresa Luenne

Inventor:
John H. Kinealy

UNITED STATES PATENT OFFICE.

JOHN H. KINEALY, OF FERGUSON, MISSOURI.

DIAPHRAGM.

1,150,606.  Specification of Letters Patent.  Patented Aug. 17, 1915.

Application filed March 19, 1915. Serial No. 15,544.

*To all whom it may concern:*

Be it known that I, JOHN H. KINEALY, a citizen of the United States, residing at Ferguson, in the county of St. Louis and the State of Missouri, have invented a new and useful Improvement in Diaphragms, of which the following is a full, clear, and exact specification, reference being had to the accompanying drawings, which form a part thereof.

My invention relates to diaphragms, particularly metal diaphragms, used in connection with fluid pressure motors and other devices such as water, steam and gas regulators, where it is desirable to use a diaphragm that is capable of considerable motion and that requires only a slight pressure to move it.

My invention relates particularly to diaphragms such as are shown and described in Letters Patent of the United States, #988,472, granted to me April 4, 1911.

The object of my invention is to provide a diaphragm that will embody the advantages of the diaphragm of said patent and which diaphragm will be of a circular shape.

My invention is fully shown in the accompanying drawings where similar letters are used to designate similar parts.

Figure 1:
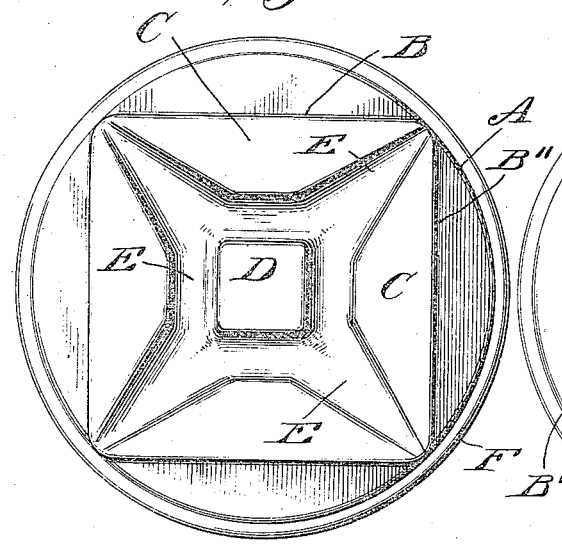
Figure 3:
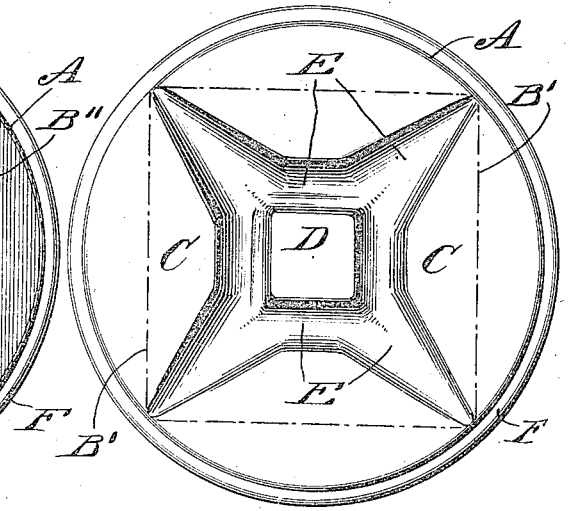
Figure 2:
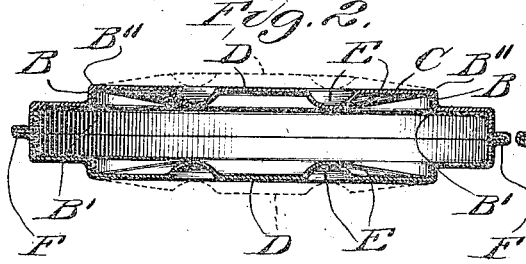

Figure 1 is a plan view of a bellows made by joining together two diaphragms each embodying one form of my invention; Fig. 2 is a diametrical section of Fig. 1; Fig. 3 is a plan view of a bellows made by joining together two diaphragms each of which embodies another form of my invention; and Fig. 4 is a diametrical section of Fig. 3.

Referring to the figures, A is a diaphragm whose periphery is the circumference of a circle and which has formed upon its surface the polygon B'. In the form shown in Figs. 1 and 2 a part of the surface of the diaphragm A has been pressed upwardly so as to form a cylinder whose sides extend at right angles to the face of the diaphragm and whose base is the primary polygon B'. At the upper end of this cylinder B is the secondary polygon B''. C represents wings which in the form of diaphragm shown in Figs. 1 and 2 are so arranged that each wing has one side of the secondary polygon B'' as an axis about which it may turn. These wings extend inwardly toward the center of the diaphragm. D is a central piece which preferably has the shape of a polygon similar to the secondary polygon B''. E is a flexible member connecting the wings C to one another and to the central piece D. I prefer to make the flexible member E by stamping it out of the metal of the diaphragm so as to form corrugations connecting the wings and also connecting the wings and the central piece. These corrugations connecting the wings extend from the corners of the polygon B'' toward the center thereof and gradually increase in depth from the corners of the polygon toward the center until they meet with and have the same depth as the corrugations between the central piece and the inner edges of the wings.

Figure 4:
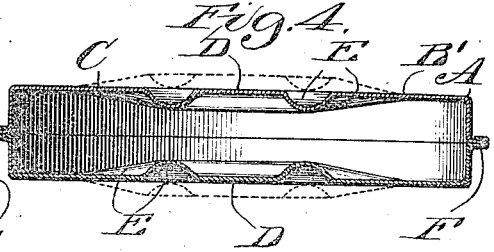

In the form of diaphragm shown in Figs. 3 and 4 the corrugations E are formed in the surface of the circular diaphragm A, and the polygon B' will not appear until after the diaphragm has been used at least once and then the outline of the polygon B' will be formed by the bending of the wings C. This is not as good a form of my invention as the one in which the polygon B' is formed by stamping as in the case of the diaphragm of Figs. 1 and 2, because while the wings C of the diaphragm in Fig. 3 in bending will bend along the side of the polygon B' as axes, there is more or less adverse stresses brought on the segments lying between the sides of the polygon and the periphery of the diaphragm. These stresses are not present in the form of the diaphragm shown in Fig. 1 since the member B connecting the primary polygon B' with the secondary polygon B'' tends to stiffen and hold in place the segments lying between the edges of the polygon B' and the periphery of the diaphragm A.

The advantage of this circular form of diaphragm lies in the fact that a bellows such as shown in the drawings may be made by stamping two diaphragms out of thin metal and each diaphragm will be formed as the bottom of a circular dish and these dishes may be joined together by a spun joint such as is shown at F. If the diaphragm is not round but is polygonal, it is impossible to form a bellows having a spun joint.

The operation of the diaphragm when used as a bellows or a motor is as follows: When pressure is brought to bear on the under surface of the diaphragm the wings C turn, each about one side of the polygon to which they are attached, through a small angle and the inner edges of the wings rise and with them rises also the central piece D. As the wings turn the corrugations are spread apart so as to allow the edges to separate somewhat from one another and also separate from the central piece D. The position of the wings and the central piece D when the diaphragm has moved from normal position is as is shown by the dotted lines in Figs. 2 and 4. When the pressure beneath the diaphragm is reduced so that the pressure on the upper side becomes greater, the wings and the central piece of the diaphragm are returned to normal position.

I prefer to have the primary polygon of such a size that it is inscribed in the diaphragm A, and I prefer to use a polygon having four sides. In the drawings the polygons are shown as having their corners slightly rounded instead of sharp, in order that the metal of which the diaphragm is made will not be cut or torn during the process of forming.

It is evident that my invention may be embodied in a circular diaphragm provided with any desired number of wings and of any desired size.

What I claim as new and desire to secure by Letters Patent, is:

1. In a diaphragm whose periphery is the circumference of a circle, a polygon having its sides in the plane of said circle, wings each of which has one of the sides of said polygon as an axis about which it may turn, and a flexible member connecting said wings in such a way that they may simultaneously turn each about its own axis, substantially as described.

2. In a diaphragm whose periphery is the circumference of a circle, a primary polygon having its sides in the place of said circle, a secondary polygon similar to said primary polygon, a connecting member extending from the periphery of said primary polygon to the periphery of said secondary polygon, wings each of which has one side of said secondary polygon as an axis about which it may turn, and a flexible member connecting said wings in such a way that they may simultaneously turn each about its own axis, substantially as described.

3. In a diaphragm whose periphery is the circumference of a circle, a primary polygon having its sides in the plane of said circle, a secondary polygon of the same size as and similar to said primary polygon and lying in a plane different from but parallel to the plane of said circle, a connecting member extending from the periphery of said primary polygon to the periphery of said secondary polygon, wings each of which has one side of said secondary polygon as an axis about which it may turn, and a flexible member connecting said wings in such a way that they may simultaneously turn each about its own axis, substantially as described.

4. In a diaphragm whose periphery is the circumference of a circle, a primary polygon inscribed in said circle, a secondary polygon of the same size as and similar to said primary polygon and lying in a plane different from but parallel to the plane of said circle, a connecting member extending from the periphery of said primary polygon to the periphery of said secondary polygon, wings each of which has one side of said secondary polygon as an axis about which it may turn, and a flexible member connecting said wings in such a way that they may simultaneously turn each about its own axis, substantially as described.

5. In a diaphragm whose periphery is the circumference of a circle, a primary polygon inscribed in said circle, a secondary polygon similar to said primary polygon, a connecting member extending from the periphery of said primary polygon to the periphery of said secondary polygon, wings each of which has one side of said secondary polygon as an axis about which it may turn, a central piece, and a flexible member connecting the wings and the central piece, substantially as described.

6. In a diaphragm whose periphery is the circumference of a circle, a primary polygon inscribed in said circle, a secondary polygon of the same size as and similar to said primary polygon and lying in a plane different from but parallel to the plane of said circle, a connecting member extending from the periphery of said primary polygon to the periphery of said secondary polygon, wings each of which has one side of said secondary polygon as an axis about which it may turn, a central piece, and a flexible member connecting the wings and the central piece, substantially as described.

7. In a diaphragm whose periphery is the circumference of a circle, a primary polygon inscribed in said circle, a secondary polygon of the same size as and similar to said primary polygon and lying in a plane different from but parallel to the plane of said circle, a connecting member extending from the periphery of said primary polygon to the periphery of said secondary polygon, wings each of which has one side of said secondary polygon as an axis about which it may turn, and the adjacent edges of the wings diverging from the corners of said polygon toward the center thereof, corrugations connecting the adjacent edges of the wings, the depth of said corrugations increasing from the corners of said polygon toward the center, a central piece, and corrugations between the central piece and the inner edges of the wings, substantially as described.

8. In a diaphragm whose periphery is the circumference of a circle, a primary polygon inscribed in said circle, a secondary polygon of the same size as and similar to said primary polygon and lying in a plane different from but parallel to the plane of said circle, a connecting member extending from the periphery of said primary polygon to the periphery of said secondary polygon, wings each of which has one side of said secondary polygon as an axis about which it may turn, and the adjacent edges of said wings diverging from the corners of said polygon toward the center thereof, a central piece having the shape of a polygon similar to said secondary polygon and lying inside of the inner edges of said wings, corrugations between the wings and the sides of said central piece, and corrugations connecting the adjacent edges of the wings, the depth of said corrugations between the wings increasing from the corners of the polygon toward the center until they meet with and have the same depth as the corrugations between the central piece and the inner edges of the wings, substantially as described.

In testimony whereof I have signed my name to this specification in the presence of two subscribing witnesses.

JOHN H. KINEALY.

Witnesses:
SUDIE J. WOODRUFF,
THERESA SUEME.